(Model.)
R. H. SMITH.
PROCESS OF MANUFACTURING ELASTIC FACED TYPE.
No. 306,784. Patented Oct. 21, 1884.
*Fig. I*
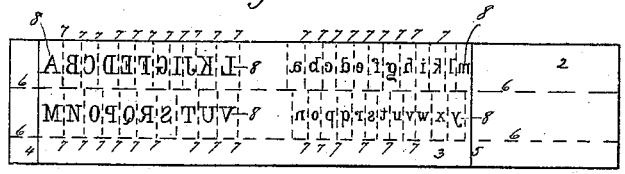
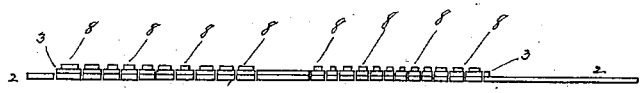
*Fig. II*
Witnesses. T. A. Curtis.
Geo. S. Tiffany
Inventor.
R. Hale Smith form these type I prepare a thin plate, 2, of
UNITED STATES PATENT OFFICE.

R. HALE SMITH, OF SPRINGFIELD, MASSACHUSETTS.

PROCESS OF MANUFACTURING ELASTIC-FACED TYPE.

SPECIFICATION forming part of Letters Patent No. 306,784, dated October 21, 1884.

Application filed October 30, 1883. (Model.)

*To all whom it may concern:*

Be it known that I, R. HALE SMITH, of Springfield, in the county of Hampden and State of Massachusetts, have invented a new and useful Improved Process of Manufacturing Elastic-Faced Type, of which the following is a specification and description.

The object of my invention is to produce any desired number of thin light type, each having an elastic printing-face and a hard rigid body or backing, and all of exactly the same thickness from the printing-face to the back; and I accomplish this by the process substantially as hereinafter described, and illustrated in the accompanying drawings, in which—

Figure I is a plan view showing an elastic or rubber facing vulcanized upon a thin plate of some rigid hard material, and Fig. II is an edge or side view showing the elastic facing and hard plate cut or separated into printing-type.

In the drawings, 2 in Fig. II represents the rigid body or backing of the type, and 3 represents an elastic facing having the printing-characters 8 made thereon, and all made of exactly the same thickness from the printing-face to the back on the opposite side. To form these type I prepare a thin plate, 2, of any suitable material—such as metal, gutta-percha, hard rubber, brass being preferred—and of uniform thickness throughout, and perfectly flat, and place it upon a solid and flat support, and vulcanize upon its upper surface an elastic or rubber stereotype from a mold taken from a collection of ordinary metal type of the desired style and size, this plate 2 and stereotype-facing 3 together forming a page or sheet of stereotype having an elastic face. When this is done, this sheet 2 is then laid upon a plane flat bed in a press or machine, with the elastic printing-face uppermost, and a knife or die is forced down upon the same at the lines 6, separating the sheet at those lines into strips, and the individual types are then separated from each other by forcing the sharp knife or die down and through the strips at the lines 7. In this process of separating the sheet into individual types both the elastic facing 3 and the hard plate 2 are cut by the knife or die, so that when the type are all separated the hard backing is perfectly flat, and the type are complete just as they come from the press. It will be seen that in this process of forming type having a hard rigid backing with an elastic printing-face I vulcanize the elastic stereotype-facing to a plate, and then separate the stereotype so formed into individual type afterward. Type made from thin plate by this process are very light, and are adapted to be used in a variety of cases where the ordinary metal-bodied elastic-faced type would be too heavy and could not be used.

Having thus described my invention, what I claim as new is—

The process hereinbefore described of forming elastic-faced type by vulcanizing an elastic facing having printing-characters thereon to a thin plate of hard or rigid material, and afterward separating each individual type therefrom by cutting through both the elastic facing and the rigid plate, substantially as described.

R. HALE SMITH.

Witnesses:
T. A. CURTIS,
GEO. S. TIFFANY.